Patented Aug. 8, 1944

2,355,600

UNITED STATES PATENT OFFICE 2,355,600

FORMALDEHYDE REACTION PRODUCT AND ITS PREPARATION

Joseph Frederic Walker, Lewiston, N. Y., assignor to E. I. du Pont de Nemours & Company, Wilmington, Del., a corporation of Delaware No Drawing. Application February 7, 1942, Serial No. 429,947. In Canada August 22, 1941

7 Claims. (Cl. 260—500)

This invention relates to formaldehyde reaction products such as the reaction products of formaldehyde with sulfamates, particularly calcium sulfamate.

This application is a continuation-in-part of my copending application Serial No. 358,521, filed September 26, 1940.

Formaldehyde reacts with sulfamates, for example, calcium sulfamate, under either acidic or alkaline conditions. It is believed that under acidic conditions, the reaction product is a methylene type compound of the formula

$$Ca(SO_3N:CH_2)_2$$

whereas under alkaline conditions a methylol type compound of the formula

$$Ca(SO_3NH.CH_2OH)_2$$

is produced. As disclosed in my above-identified copending application, I have found that the product prepared under alkaline conditions is much more stable and more soluble in water than product prepared under acidic conditions. This application relates to an improved method of reacting formaldehyde with calcium sulfamate whereby an especially stable, soluble, and useful reaction product may be obtained.

I have discovered that the reaction between formaldehyde and calcium sulfamate is best carried out using a substantially anhydrous reaction medium having an alkalinity corresponding to a pH value of 8 to 10. The reaction medium is a non-aqueous, inert liquid used, preferably, in sufficient quantity to wet the solids to a paste so that the entire mixture may be subjected to a kneading treatment during the reaction. Product prepared under such conditions, particularly when it contains a small amount of a stabilizer, such as an alkanol amine, is surprisingly stable and very well suited for use in a variety of practical applications. Accordingly, it is an object of this invention to provide an improved method of preparing a formaldehyde-calcium sulfamate reaction product whereby a stable, highly useful product may be readily obtained. Other objects will be apparent from the following description of the invention.

In practicing the present invention, the reaction is effected under substantially anhydrous conditions in an alkaline medium having a pH within the range 8 to 10. Best results are produced at a pH within the range 9 to 10. At higher alkalinities, the reaction product exhibits a marked tendency to decompose, and this tendency is greatly increased by the presence of substantial amounts of moisture. At alkaline pH values below 8, the rate of reaction is too slow for practical purposes. In the preferred embodiment of the method, certain definite proportions of the reactants and a non-aqueous, inert liquid are used so as to produce a reaction mixture which is capable of being effectively kneaded during the course of the reaction. A stabilizer, e. g. a trialkanol amine and preferably triethanolamine, is added to the reaction mixture when the reaction has been substantially completed, after which the product is dried under anhydrous conditions at a suitable temperature.

The use of a reaction mixture which is substantially anhydrous is important from the standpoint of the stability of the final product. This is especially true when the alkalinity of the mixture is within the preferred range of a pH of 9 to 10 or higher. Accordingly, the present method involves the use of reactants which are substantially water-free or anhydrous and also the use of non-aqueous, inert diluents or solvents. Because the stability of the final product is adversely affected by the presence of water, it is also important that not only the reaction mixture be substantially free from water, but that operations to isolate the reaction product be carried out in the absence of water and that the finished product be stored out of contact with water or atmospheric moisture.

In the specification and the appended claims, the terms "substantially anhydrous medium," "substantially anhydrous conditions," and the like, are used to mean that the reaction mixture during the course of the reaction contains not more than about 2% by weight of water. Preferably, the water content is kept below 1%. Small amounts of water such as those contained in ordinary paraformaldehyde, which is one of the preferred reactants, and which may be introduced in the form of an aqueous solution of an alkaline material, e. g. sodium hydroxide, used to adjust the alkalinity of the mixture, are permissible since such small amounts apparently do not adversely affect the reaction or the stability of the product. However, amounts of water greater than about 2% of the total weight of the reaction mixture are harmful and should not be used.

I prefer to use as one of the reactants anhydrous calcium sulfamate. Calcium sulfamate is available commercially in the form of the tetrahydrate. I have found that the tetrahydrate may be conveniently dehydrated to remove substantially all of its water of crystallization by merely heating it for eighteen hours or so at a temperature of about 80° C. Whether or not the water of crystallization has been effectively removed can be determined by removing a three gram sample of the material being dehydrated, spreading the same in a shallow dish and heating it at 80° C. for two hours. When the weight loss during the two hour period is less than 0.2%, the material is sufficiently dehydrated for the present purpose.

Ordinary commercial paraformaldehyde is the most practical source of formaldehyde for use in practicing the present method. Paraformaldehyde will contain the equivalent of approximately 95% or more of formaldehyde by weight, the remaining content being mostly water. Any of the other well known polymers of formaldehyde, such as the various polyoxymethylenes, which yield formaldehyde under alkaline conditions, are suitable for use although the preferred material is paraformaldehyde.

It is preferred to effect the reaction in the presence of a solvent or diluent. Any non-aqueous liquid which is inert or non-reactive under the conditions employed towards the reactants and also towards the reaction product may be used for this purpose. The terms "inert" and "non-reactive" are used throughout the specification and in the claims to mean liquids which do not react with either of the reactants or the reaction products under the conditions of use in an irreversible manner. Obviously the liquid should be one having a boiling point which is above the temperature at which the reaction is carried out. Preferably the liquid is one which will dissolve substantial amounts of one or both of the reactants. Methanol is such a liquid and its use is preferred. Ethanol can also be used although it is definitely less satisfactory than methanol.

The temperature of the reaction mixture should be maintained at a value not exceeding 65° C. The operative range of temperatures is from the lowest temperature at which reaction will occur, i. e. slightly below room temperature to about 65° C., whereas the preferred range is 20 to 40° C. In recovering the reaction product any drying operation should be carried out at as low a temperature as is practicable and should not exceed the maximum temperature stated above. Drying at about 50° C. under vacuum is preferred.

Product having good stability will be formed when the reaction is carried out in the substantial absence of water at a pH within the range indicated and when the temperature during the reaction and drying periods is maintained within the limits set forth. The most stable product is obtained when a stabilizer is added to the reaction mixture. The stabilizer, e. g. triethanolamine, may be added along with the reactants, at any time during the course of the reaction, after the reaction is complete or even after the recovery of the reaction product from the reaction mixture. Most satisfactory results are realized when the stabilizer is added to the reaction mixture about the time the reaction is substantially complete and prior to any recovery operations. The preferred stabilizers are the trialkanol amines, particularly triethanolamine, although any of the alkanol amines are effective. Relatively small amounts of stabilizer are required, 0.5 to 5% being satisfactory and 1 to 2.5% by weight being preferred.

The invention may be better understood by the following example which is intended to be illustrative:

Example

Calcium sulfamate tetrahydrate was heated at 80° C. for eighteen hours so as to give a product having substantially no water of crystallization. 928 grams (4 moles) of the dehydrated product together with 256 grams of commercial paraformaldehyde, equivalent to 8 moles of formaldehyde, were placed in a Baker-Perkins kneader and mixer which had been provided with a jacket through which cooling water might be circulated and with a reflux condenser. The materials were mixed in the dry form for five minutes. 500 grams of methanol containing less than 0.1% by weight of water and to which had been added 1 gram of a 30% aqueous solution of sodium hydroxide was then added. The resultant mixture was kneaded for about twenty minutes, after which time a small quantity was removed for test purposes. The test sample was mixed with four times its volume of water and the pH of the resulting solution determined on a Beckman pH meter. Additional small amounts of 30% sodium hydroxide solution were added from time to time to maintain the pH value, determined as indicated, within the range 9.5 to 10. After each addition of alkali, the reaction mixture was agitated for a short time to insure thorough mixing, before removing a test sample for pH determination. A total of 1.56 grams of the sodium hydroxide solution was used.

The mixture was kneaded for approximately three hours, during which time its temperature was kept within a range of 30 to 40° C. by applying cooling water to the jacket of the apparatus when necessary. At the end of three hours the reaction was substantially complete and 23.7 grams of triethanolamine dissolved in 50 grams of methanol was added and thoroughly mixed in with the entire charge.

The reaction mixture was poured into aluminum drying trays in thin layers and placed under vacuum at 50° C. until a dry, friable mass resulted. Best drying results are obtained when the product is dried in thicknesses not exceeding about one inch. About sixteen hours drying time at 50° C. is required.

Product obtained by the above procedure should be packed in air-tight containers which have been flushed with dry air or nitrogen. The product is very soluble in water and the pH of a 20% solution when tested on a Beckman pH meter will lie within the range 8 to 10. The product is colorless, friable and has the appearance of solid foam. It is substantially odorless and contains from about 17% to 20.5%, the theoretical value, of combined formaldehyde. The good stability of the product is indicated by the fact that it does not undergo exothermic decomposition upon being heated for one hour at 80° C., then exposed to moist air for one hour at ordinary temperature followed by subsequent heating at 80° C. for an additional hour. This is a severe test and it may be noted that product which has been prepared using a reaction mixture having a pH value above 10 will almost always decompose when subjected to this test.

Very often, product prepared in reaction media at alkalinities above a pH of 10, especially when prepared in the presence of substantial amounts of water, undergoes a similar decomposition even at room temperatures. Such decomposition occurs spontaneously, is highly exothermic, is accompanied by considerable evolution of malodorous gases having an amine odor, and leaves a black, charry residue.

Product may also undergo a second type of decomposition which is relatively slow as distinguished from the spontaneous highly exothermic type. This slow decomposition is accompanied by an increased development of acidity. As the acidity increases the solubility decreases and the product becomes eventually substantially insoluble in water. This type of decomposition is prevented or greatly inhibited by avoiding the presence of water both during the reaction and during storage of the product, and by the use of a stabilizer such as triethanolamine.

The effects of excess alkali and of a stabilizer such as triethanolamine upon the stability of the product and upon its solubility in water are indicated by the data shown in the following table. Anhydrous calcium sulfamate and paraformaldehyde were reacted in methanol in a kneader at a pH of 9.5 to 10. Before completion of the reaction, part of the mixture was removed and its pH adjusted to approximately 11 by the addition of concentrated aqueous caustic. A second part of the mixture was removed after reaction was substantially complete and 2% by weight (based on the expected weight of the reaction product) of triethanolamine was added. All three portions were then dried under vacuum at 50° C. and subjected to stability tests. In the table, the product obtained from the residue of the original reaction mixture is designated as A, the product obtained from that portion whose pH was adjusted to about 11 is designated as B, and the product stabilized with triethanolamine is designated as C. All three products were stored at room temperature under identical conditions during the stability tests.

tained using a substantial excess of either one of the reactants. However, stoichiometric proportions of the reactants will generally be used, and there are some indications that a slight excess, e. g. from 1 to 2% up to 10%, of calcium sulfamate gives slightly improved results because it assures the absence in the final product of unreacted formaldehyde.

The amount of solvent or diluent employed is not critical, but in general should be sufficient to prevent excessive local increases in temperature and to permit effective agitation. It is preferred that the amount of solvent be such that the resulting reaction mixture is of a pasty consistency so as to permit kneading the mixture during the reaction. The physical form of the final product is affected considerably by the amount of solvent employed. With methanol I prefer to use an amount corresponding to 30 to 35% by weight based upon the total weight of the reaction mixture. When lesser amounts are used, e. g. 25% by weight of methanol, the final product is inclined to become dusty upon drying.

Agitation of the reaction mixture during the course of the reaction may be accomplished using any of the conventional means employed for that purpose. When using the preferred amount of methanol, the reaction mixture is relatively viscous and is of such consistency that agitation by means of a kneading type agitator is especially effective. The use of only such amount of methanol, or other inert liquid, as is necessary to prevent local over-heating and as permits of effective agitation by means of a kneader is highly advantageous. It avoids the necessity of handling large amounts of methanol, which must eventually be removed from the product by evaporation; the rate of reaction is increased due to the increased concentration of the reactants in in the mixture; the capacity of the entire processing equipment is increased; when methanol

| | Sample | | | | | | | | | | | | |
|---|---|---|---|---|---|---|---|---|---|---|---|---|---|
| | A | | | | B | | | | C | | | | |
| Days storage | 0 | 7 | 14 | 21 | 0 | 5 | 12 | 19 | 0 | 5 | 12 | 19 | 27 |
| pH of 20% solution | 10 | 10 | 7 | 4 | 11.4 | 3 | 3 | 3 | 9.9 | 9.9 | 9.9 | 9.3 | 9.1 |
| Solubility [1] percent | 100 | 100 | 100 | 75 | 100 | 47 | 35 | 30 | 100 | 100 | 100 | 100 | 100 |
| Combined formaldehyde percent by weight | | 19 | 18 | 9 | 17 | 4 | 4 | 4 | 20 | 19 | 18 | 18 | 18 |

[1] Solubility of 5 grams of material in 25 cc. of water at room temperature.

It will be noted that product C, which was stabilized with triethanolamine, was by far the most stable. Product B decomposed substantially completely by about five days, whereas product A, prepared at a pH of 9.5 to 10 and unstabilized, was only about one-half decomposed after twenty-seven days under the same conditions. Products A and C were stable when heated at 80° C., subjected to exposure for one hour to moist air and re-heated for one hour at 80° C., whereas product B decomposed spontaneously when subjected to that test.

Any of the strong inorganic alkalies such as the alkali and alkaline earth metal hydroxides may be used to adjust the alkalinity of the reaction mixture. The alkali metal hydroxides, particularly sodium hydroxide, are preferred. Instead of adding the alkali in the form of an aqueous solution, it may be added as an alcoholic solution.

The proportions of the reactants may be varied considerably without departing from the scope of the invention since good results may be obtained using a substantial excess of either one is used in certain proportions, the physical characteristics of the product are improved; and the use of such minimum amount of solvent in general makes the process more attractive economically. The agitator as well as the reaction vessel and any other equipment which comes into contact with the reaction mixture or the final product may be constructed of glass, aluminum, enamel ware, stainless steel or the like construction material. The final anhydrous product may be stored in sealed containers for considerable periods of time without its stability being decreased to any substantial extent.

The foregoing examples and specific embodiments of the invention are intended to be illustrative only and the invention is not to be limited thereby except as indicated in the appended claims.

I claim:

1. The method which comprises reacting formaldehyde with calcium sulfamate under substantially anhydrous conditions in a liquid reaction medium, the amount of said liquid reaction medium being so restricted that the reaction mass is of pasty consistency, the pH of said reaction medium falling within the range 8 to 10, and the temperature maintained during said reaction being below 65° C.

2. The method which comprises reacting paraformaldehyde with calcium sulfamate under substantially anhydrous conditions in a liquid reaction medium, the amount of said liquid reaction medium being so restricted that the reaction mass is of pasty consistency, the pH of said reaction medium falling within the range 8 to 10, and the temperature maintained during said reaction being below about 65° C.

3. The method which comprises reacting formaldehyde with anhydrous calcium sulfamate under substantially anhydrous conditions in a liquid reaction medium, the amount of said liquid reaction medium being restricted so that the reaction mass is in a pasty consistency, said reaction being carried out in the presence of an alkanol amine stabilizer at a pH within the range 8 to 10 and at a temperature below 65° C.

4. The method which comprises reacting paraformaldehyde with anhydrous calcium sulfamate under substantially anhydrous conditions in a liquid reaction medium, the amount of said liquid reaction medium being restricted so that the reaction mass is in a pasty consistency, said reaction being carried out in the presence of an alkanol amine stabilizer at a pH within the range 8 to 10 and at a temperature below about 65° C.

5. The method which comprises reacting formaldehyde with anhydrous calcium sulfamate in a substantially anhydrous, liquid reaction medium comprising methanol and an alkanol amine stabilizer, the amount of said liquid reaction medium being restricted so that said reaction mass is in a pasty consistency, said reaction being carried out at a pH within the range 8 to 10 and at a temperature below about 65° C.

6. The method which comprises reacting formaldehyde with anhydrous calcium sulfamate in a substantially anhydrous, liquid reaction medium comprising ethanol and an alkanol amine stabilizer, the amount of said liquid reaction medium being restricted so that said reaction mass is in a pasty consistency, said reaction being carried out at a pH within the range 8 to 10 and at a temperature below about 65° C.

7. The method which comprises reacting formaldehyde with anhydrous calcium sulfamate in a substantially anhydrous, liquid reaction medium comprising methanol and an ethanol amine stabilizer, the amount of said liquid reaction medium being restricted so that said reaction mass is in a pasty consistency, said reaction being carried out at a pH within the range 8 to 10 and at a temperature below about 65° C.

JOSEPH FREDERIC WALKER.